3,701,634
REACTION VESSEL ASSEMBLY
Raymond D. Worden, Houston, Tex., assignor to Ruska
Instrument Corporation, Houston, Tex.
Filed May 10, 1971, Ser. No. 141,599
Int. Cl. B01l 3/14
U.S. Cl. 23—259
1 Claim

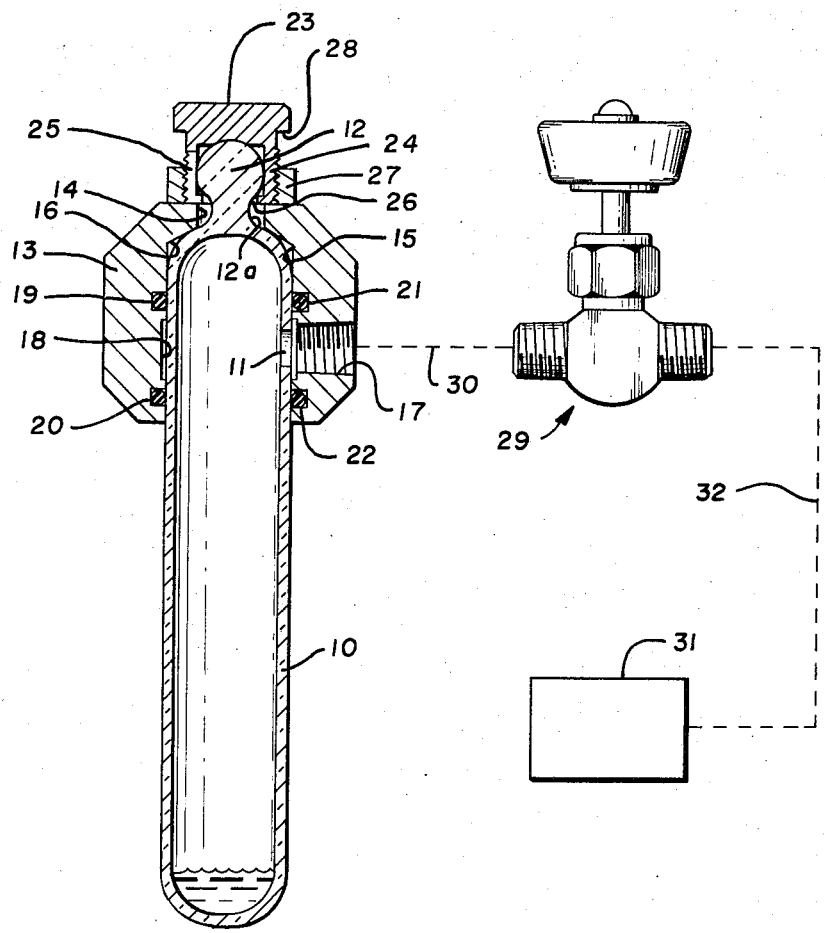

ABSTRACT OF THE DISCLOSURE

A reaction vessel assembly including a reaction vessel and cap for readily viewing the reaction of two or more compounds in which pressure developed within the vessel does not tend to separate the vessel and cap thus permitting them to be held together by a simple latch mechanism with provisions for one or more compounds to be added after the cap has been secured to the reaction vessel.

---

This invention relates to a reaction vessel assembly for observing the reaction of two or more chemicals.

Reaction vessels are commonly used particularly in laboratories to determine and observe the reaction between two or more compounds. As the reaction is frequently unknown, the vessel must be securely closed to avoid escape of the contents of the vessel. This has been carried out in the past and many different types of caps fixed to the vessel but so far as is known these caps have all been subject to pressure developed within the vessel and required a substantial mechanical connection between the vessel and cap to avoid escape of the contents of the vessel. Such a connection is difficult to provide with a glass reaction vessel.

It is an object of this invention to provide a reaction vessel assembly in which pressure in the vessel is not effective on the cap in a direction tending to separate the cap from the vessel and the cap and vessel may be held in assembled condition by a simple latch mechanism.

Other objects, features and advantages of the invention will be apparent from the drawing, the specification and the claim.

In the drawing, the single figure is a view partly in vertical cross-section illustrating the reaction vessel assembly and partly in elevation diagrammatically showing the associated valving and pressure container.

The reaction vessel 10 is cylindrical in form and closed at both ends to provide a sealed container. The vessel is preferably made of glass to permit observation of the contents of the vessel and provide for easy cleaning.

Access to the interior of the vessel is provided by an orifice 11 in the cylindrical wall of the vessel. One or more holes may combine to provide the orifice 11 with such holes spaced about the circumference of the vessel at a common distance from one end thereof.

As a part of the latch assembly, the vessel has formed at one end thereof a latch member 12.

A reaction vessel cap 13 is provided for sealing the reaction vessel 10. The cap 13 has a bore 14 therethrough for receiving the reaction vessel latch member 12 and a counterbore 15 for receiving one end of the reaction vessel including that portion of the vessel which contains the orifice 11. The shoulder 16 between the bore and counter-bore provides a stop for limiting movement of one end of the reaction vessel 10. A port 17 is provided in the cap 13 in register with the orifice 11. The counterbore in the cap has a groove 18 formed therein which extends circumferentially about the bore and communicates with the port 17 to provide communication between the orifice 11 and the port 17 with the reaction vessel 10 and cap 13 in any relative orientation.

In order to seal between the port 17 and orifice 11 a pair of seals 19 and 20 seal between the reaction vessel and cap and straddle the orifice 11 and port 17. Preferably the seals are provided by O-rings which are carried in O-ring grooves 21 and 22. As the bore 15 is formed on a constant diameter, as is the outer cylindrical surface of the reaction vessel 10, the sealed areas provided by seals 19 and 20 are identical in size and pressure within the groove 18 will not be effective to move the cap axially of the reaction vessel in a direction to separate the vessel and cap. Thus, pressures generated within the vessels by the interaction of two compounds will not tend to separate the cap from the vessel and a strong mechanical latch between the cap and vessel is not necessary.

In order to mechanically secure the cap and vessel together to avoid their accidental separation during use, a latch clamp 23 is provided which cooperates with the latch member 12 to hold the shoulder 16 in contact with the end of the vessel 10 and thus prevent accidental separation of the vessel and cap. Preferably the latch clamp 23 is provided by an inverted cup-shaped member which has an exterior threaded collet section 24 extending from one end thereof. The collet is ring-like in configuration and is split in several places, one of which is shown at 25 to provide a depending split collet on the clamp 23. The free end of the collet has an in-turned flange 26 which is smaller in diameter than the largest diameter of the latch member 23. With the latch clamp in position, the in-turn flange 26 surrounds the neck portion 12a of the latch member.

In order to releasably secure the latch clamp in position, a nut 27 is threadedly received about the flange 24. With the nut screwed down on the flange 24 in the position shown, the split collet is incapable of expanding as it is held in position by the nut 27 and the latch clamp is effective to prevent accidental dislodgement of the reaction vessel cap from the vessel. By screwing the nut 27 up into abutment with the shoulder 28 provided on the latch cap 23, the lower end of the split flange 24 is free to expand outwardly. The latch cap 23 is made of a resilient material which permits such expansion and a release of the latch cap from the latch member to permit separation of the reaction vessel and the reaction vessel cap.

In order that one or more compounds may be introduced into the reaction vessel with the cap securely in place, it is preferred that a valve mechanism indicated generally at 29 be connected to the port 17 either directly or through a suitable conduit as indicated by the dashed line 30.

A vessel containing a compound to be introduced into the reaction vessel as indicated generally by the vessel 31 which may be connected to the valve 29 either directly or through a suitable conduit as indicated by the dashed line 32. The valve 29 is intended to schematically indicate the use of one or more valves which are utilized to connect one or more vessels of fluid such as vessel 31 to the port 17 for introduction of such fluids into the reaction vessel. Where the reaction between the compounds is started by an external source such as heat, ultraviolet light, etc., the compounds may be introduced directly into the reaction vessel 10 before the cap is placed over the vessel. In this instance the valve 29 is closed and acts as a means for blocking or closing the port 17. A plug may be substituted in the port 17 for the valve 29 in those instances where the reaction is started by an external source.

It is believed apparent that the valve 29 may also be utilized to carefully valve off any gases which have been generated with the reaction vessel 10 to a safe disposal area.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:
1. A reaction vessel assembly comprising,
a cylindrical reaction vessel closed at both ends,
an orifice in the cylindrical wall of the vessel,
a latch member on one end of the vessel,
a reaction vessel cap having a bore therethrough for receiving the reaction vessel latch and a counterbore for receiving one end of the reaction vessel including said orifice,
a port in said cap,
spaced seals between said reaction vessel and cap straddling said orifice and port, and
a latch clamp engaging said latch member and cap and releasably holding said vessel and cap in assembled relationship.

References Cited

UNITED STATES PATENTS 3,421,857  1/1969  Reichle et al. _____ 23—292 X

FOREIGN PATENTS 324,733  11/1957  Switzerland _____ 23—259

MORRIS O. WOLK, Primary Examiner

D. G. MILLMAN, Assistant Examiner

U.S. Cl. X.R.

23—290, 292; 215—73